(12) United States Patent
Chen

(10) Patent No.: US 10,294,857 B2
(45) Date of Patent: May 21, 2019

(54) MODIFIED ENERGY-SAVING ONE-DIMENSIONAL INTERNAL COMBUSTION ENGINE

(71) Applicant: Xiaohui Chen, Zhejiang (CN)

(72) Inventor: Xiaohui Chen, Zhejiang (CN)

( * ) Notice: Subject to any disclaimer, the term of this patent is extended or adjusted under 35 U.S.C. 154(b) by 182 days.

(21) Appl. No.: 15/656,030

(22) Filed: Jul. 21, 2017

(65) Prior Publication Data
US 2017/0321599 A1    Nov. 9, 2017

Related U.S. Application Data

(63) Continuation of application No. PCT/CN2016/000086, filed on Feb. 19, 2016.

(30) Foreign Application Priority Data

Mar. 15, 2015   (CN) .......................... 2015 1 0121405

(51) Int. Cl.
| | |
|---|---|
| *F02B 61/06* | (2006.01) |
| *F02C 5/00* | (2006.01) |
| *F02B 33/28* | (2006.01) |
| *F02B 67/04* | (2006.01) |
| *F02B 73/00* | (2006.01) |
| *F02M 35/10* | (2006.01) |
| *F04B 17/00* | (2006.01) |

(52) U.S. Cl.
CPC .............. *F02B 61/06* (2013.01); *F02B 33/28* (2013.01); *F02B 67/04* (2013.01); *F02B 73/00* (2013.01); *F02C 5/00* (2013.01); *F02M 35/10281* (2013.01); *F04B 17/00* (2013.01); *Y02T 10/146* (2013.01)

(58) Field of Classification Search
CPC .......... F02B 69/04; F02B 71/00; F02B 61/06; F02B 33/28; F02B 67/04; F02B 73/00; F02M 21/02; F02M 35/10; F02M 21/0215; F02M 35/10281; F02C 5/08; F02C 5/00; F02D 25/02; Y02T 10/146; Y02T 10/36; Y02T 10/32; F05D 2220/32; F05D 2220/40; F04B 17/00
See application file for complete search history.

(56) References Cited

U.S. PATENT DOCUMENTS 4,700,542 A * 10/1987 Wang ...................... F02B 41/10
60/39.163

* cited by examiner

*Primary Examiner* — Zelalem Eshete
(74) *Attorney, Agent, or Firm* — Wayne & Ken, LLC; Tony Hom

(57) ABSTRACT

The present invention discloses an internal combustion engine, comprising a compressor, a combustion chamber, a pipeline, a spray pipe, an oil feeder, a driving device, a first safety device, a second safety device, an electric ignition device, a rack, a first bracket arranged on a top of the rack, a second bracket arranged on an upper part of the rack, a third bracket arranged on a lower part of the rack and a fourth bracket arranged on a left part of the rack. The compressor comprises an inner shell and an outer shell, wherein the inner shell comprises an upper pressing plate and a cylindrical plate; the cylindrical plate can move up and down in the cylindrical plate slot; and an outlet is formed in a non-protruding part at the bottom of the outer shell. The internal combustion engine has simple structure and high efficiency.

4 Claims, 2 Drawing Sheets ized by the machine into power. A generalized internal combustion engine includes a reciprocating piston type internal combustion engine, a rotary piston engine and a free piston engine and further includes a rotary impeller type gas turbine, a jet engine and the like, while a commonly referred internal combustion engine refers to a piston type internal combustion engine. The most common type of the piston type internal combustion engine is the reciprocating piston type internal combustion engine. A principle of the piston type internal combustion engine is that fuel and air are mixed and combusted in a cylinder, and high-temperature high-pressure gases are produced in the cylinder by the released heat energy. The gases expand to push the piston to work, and mechanical work is outputted through a crank-link mechanism or other mechanisms to drive a driven machine to work. For common diesel engines and gasoline engines, internal energy is converted into mechanical energy, and the internal energy is changed by applying work.

MODIFIED ENERGY-SAVING ONE-DIMENSIONAL INTERNAL COMBUSTION ENGINE

TECHNICAL FIELD

The present invention relates to an internal combustion engine, and particularly relates to an improved energy-saving one-dimensional internal combustion engine.

BACKGROUND

An internal combustion engine is a power machine which is a heat engine that combusts fuel inside the machine and directly converts heat energy released by the machine into power. A generalized internal combustion engine includes a reciprocating piston type internal combustion engine, a rotary piston engine and a free piston engine and further includes a rotary impeller type gas turbine, a jet engine and the like, while a commonly referred internal combustion engine refers to a piston type internal combustion engine. The most common type of the piston type internal combustion engine is the reciprocating piston type internal combustion engine. A principle of the piston type internal combustion engine is that fuel and air are mixed and combusted in a cylinder, and high-temperature high-pressure gases are produced in the cylinder by the released heat energy. The gases expand to push the piston to work, and mechanical work is outputted through a crank-link mechanism or other mechanisms to drive a driven machine to work. For common diesel engines and gasoline engines, internal energy is converted into mechanical energy, and the internal energy is changed by applying work.

SUMMARY

The purpose of the present invention is to provide an improved energy-saving one-dimensional internal combustion engine, so as to solve the problems of complex structure and low energy utilization rate in the prior art.

To solve the above problems, a technical solution adopted by the present invention is that:

An improved energy-saving one-dimensional internal combustion engine comprises a compressor, a combustion chamber, a pipeline, a spray pipe, an oil feeder, a driving device, a first safety device, a second safety device, an electric ignition device, an atomizing net, a rack, a first bracket arranged on a top of the rack, a second bracket arranged on an upper part of the rack, a third bracket arranged on a lower part of the rack and a fourth bracket arranged on a left part of the rack, wherein the driving device is arranged on the first bracket; the first safety device is arranged on the second bracket; the second safety device is arranged on the third bracket; the oil feeder is arranged on the fourth bracket.

The pipeline is formed by connecting a left part of the pipeline and a right part of the pipeline; the compressor comprises an inner shell and an outer shell; the inner shell comprises an upper pressing plate and a cylindrical plate; the interior of each of the upper pressing plate, the outer shell and the cylindrical plate is hollow; a top of the cylindrical plate is fixed under the upper pressing plate; the cylindrical plate is cylindrical, and has a caliber less than a width of the upper pressing plate; an oil inlet is formed at an upper end of a left part of the outer shell; an air inlet is formed at an upper end of a right part of the outer shell; part of a bottom of the outer shell protrudes downwards to form a cylindrical plate slot corresponding to the cylindrical plate; the cylindrical plate can move up and down in the cylindrical plate slot; part of a bottom of the cylindrical plate slot protrudes downwards to form the left part of the pipeline; an outlet is also formed at the bottom of the outer shell; a top end of the combustion chamber is fixedly connected with a bottom end of the outlet; part of a left part of the combustion chamber protrudes towards the left to form the right part of the pipeline; the right part of the pipeline is communicated with the left part of the pipeline; the atomizing net is arranged in the right part of the pipeline and is of a netted structure; a top end of the spray pipe is fixedly connected with a bottom end of the combustion chamber; a small opening is formed at a right part of the spray pipe; a control box is arranged at the small opening; an adjusting ingot is arranged in the control box; a left part of the control box is communicated with the spray pipe; a micropore is formed at a right part of the control box; a turbine wheel and a turbine shaft are arranged in an end of the spray pipe; the inner shell is arranged in the outer shell; a side surface of the upper pressing plate is bonded with an inner wall of an upper part of the outer shell; the cylindrical plate, part of the upper pressing plate and part of the bottom of the outer shell are encircled to form a main pressure chamber; and the cylindrical plate, the rest part of the upper pressing plate except for part of the upper pressing plate which participates in encirclement to form the main pressure chamber, and part of the outer shell are encircled to form an auxiliary pressure chamber.

The driving device comprises a first motor, a first gear, a first dowel bar and a first rack arranged on the first dowel bar; a bottom of the first dowel bar is fixed above the upper pressing plate; the first rack is engaged with the first gear; and the first motor can drive the first gear to rotate.

The first safety device comprises a second motor, a second gear, a bumper and a second rack fixed on the bumper; the second motor can drive the second gear to rotate; the second rack is engaged with the second gear; and the action of the bumper is that a left part of the bumper can be inserted into the middle of the first rack to prevent the first rack from moving up.

The second safety device is arranged on a right side of the control box and comprises a third motor, a third gear, a second dowel bar and a third rack; the third motor can drive the third gear to rotate. A left part of the second dowel bar stretches into the control box from the micropore; the third rack is fixed on the second dowel bar and engaged with the third gear; a right part of the adjusting ingot is fixedly connected with the left part of the second dowel bar; and the adjusting ingot and part of the left part of the second dowel bar can move left and right in the control box.

The oil feeder is arranged on a left side of the oil inlet, and the electric ignition device is arranged on a left side of the spray pipe.

The present invention has the beneficial effects of simple structure and high energy utilization rate.

DETAILED DESCRIPTION

Specific embodiments of the present invention will be further described below in combination with drawings.

Figure 1:
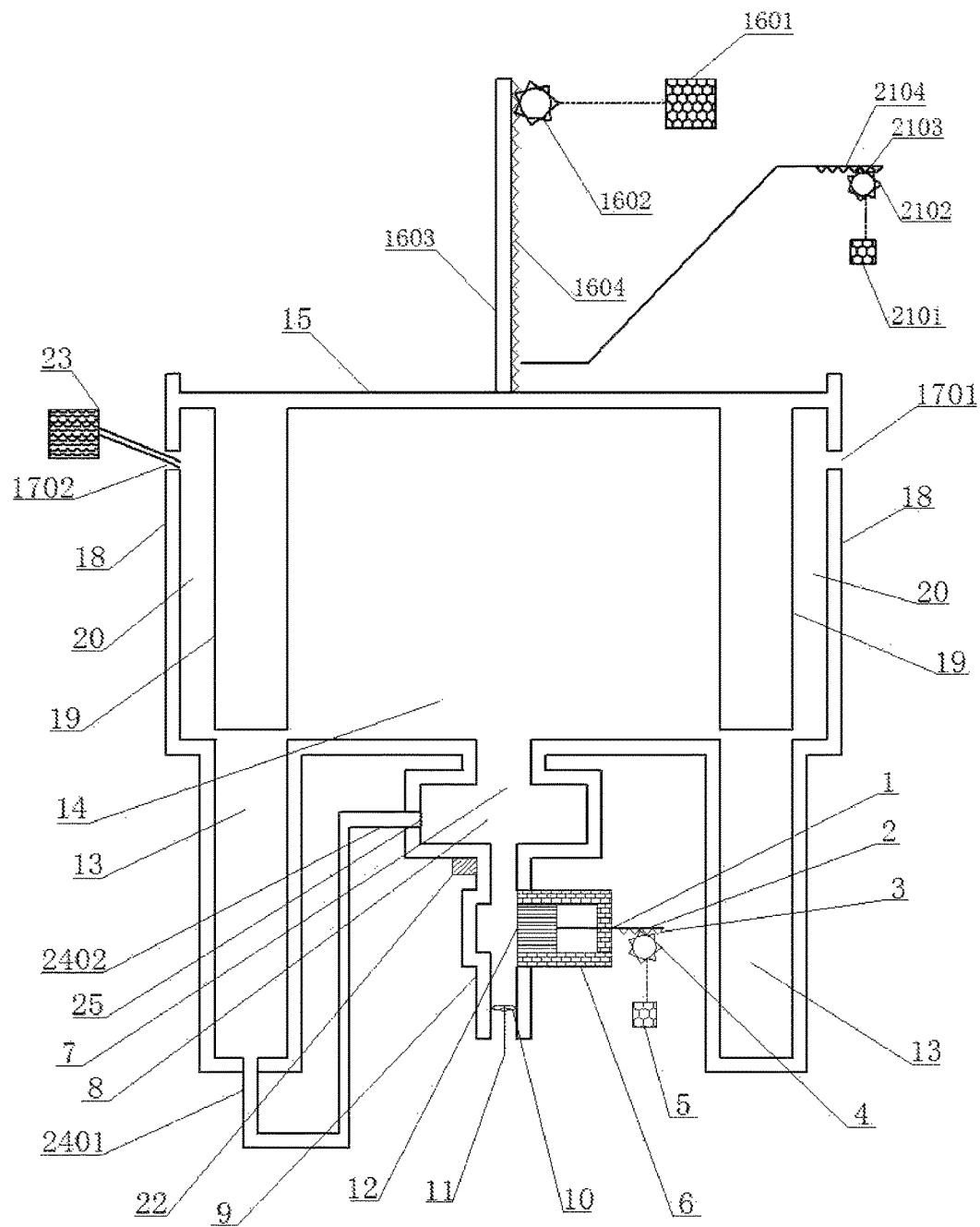
FIG. 1 is a structural schematic diagram of an improved energy-saving one-dimensional internal combustion engine.

An improved energy-saving one-dimensional internal combustion engine shown in FIG. 1 comprises a compressor, a combustion chamber 8, a pipeline, a spray pipe 9, an oil feeder 23, a driving device, a first safety device, a second safety device, an electric ignition device 22, an atomizing net 25, a rack (not shown in the figure), a first bracket (belonging to an existing device, not shown in the figure) arranged on a top of the rack, a second bracket (belonging to the prior art, not shown in the figure, similarly hereinafter) arranged on an upper part of the rack, a third bracket arranged on a lower part of the rack and a fourth bracket arranged on a left part of the rack, wherein the driving device is arranged on the first bracket; the first safety device is arranged on the second bracket; the second safety device is arranged on the third bracket; and the oil feeder 23 is arranged on the fourth bracket.

Figure 2:
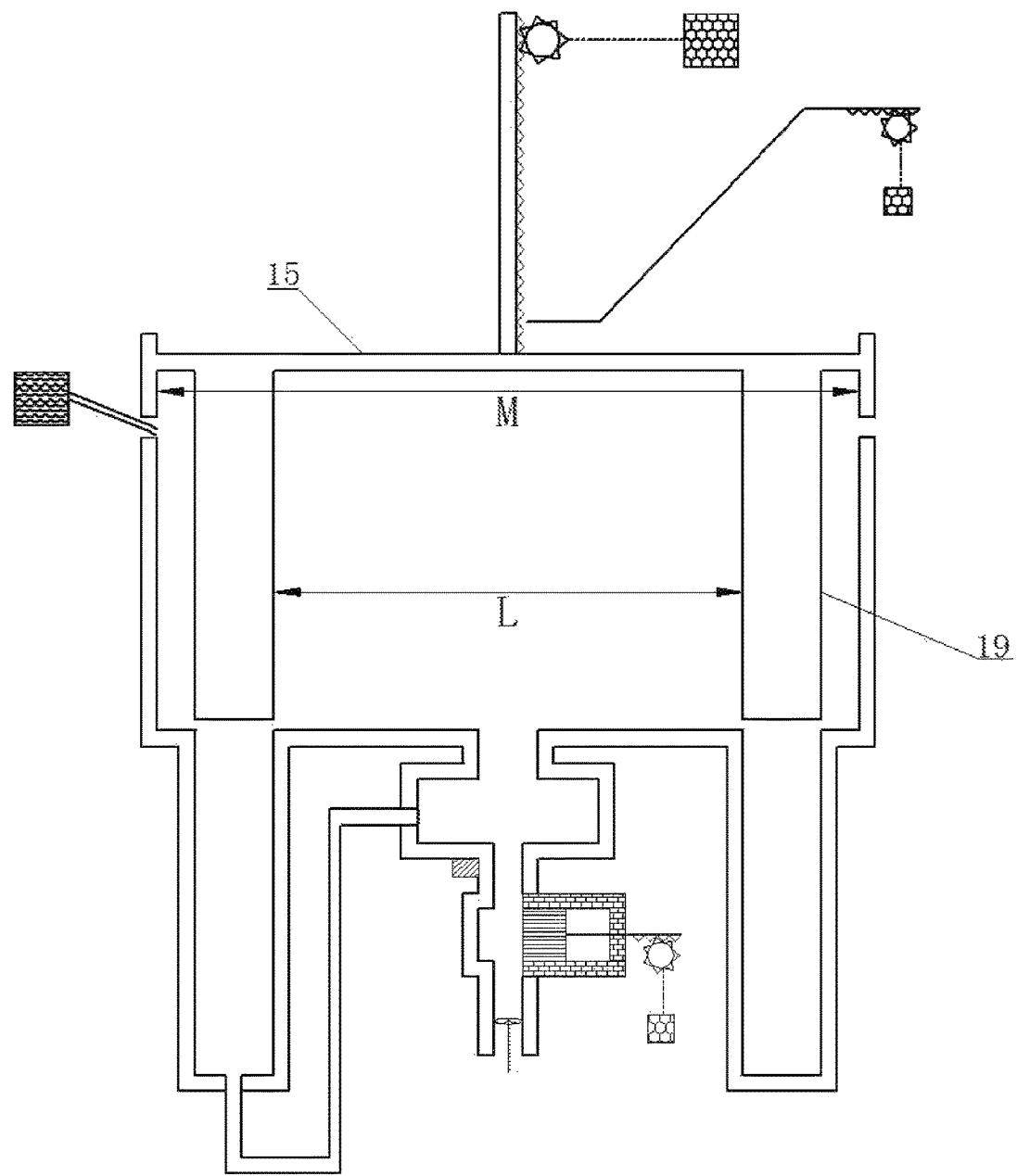
FIG. 2 is a dimensional schematic diagram of some components of an improved energy-saving one-dimensional internal combustion engine.

The pipeline is formed by connecting a left part 2401 of the pipeline and a right part 2402 of the pipeline; the compressor comprises an inner shell and an outer shell 18; the inner shell comprises an upper pressing plate 15 and a cylindrical plate 19; the interior of each of the upper pressing plate 15, the outer shell 18 and the cylindrical plate 19 is hollow; a top of the cylindrical plate 19 is fixed under the upper pressing plate 15; the cylindrical plate 19 is cylindrical, and has a caliber L less than a width M of the upper pressing plate 15 (as shown in FIG. 2); an oil inlet 1702 is formed at an upper end of a left part of the outer shell 18; an air inlet 1702 is formed at an upper end of a right part of the outer shell 18; part of a bottom of the outer shell 18 protrudes downwards to form a cylindrical plate slot 13 corresponding to the cylindrical plate 19; the cylindrical plate 19 can move up and down in the cylindrical plate slot 13; part of a bottom of the cylindrical plate slot 13 protrudes downwards to form the left part 2401 of the pipeline; an outlet 7 is also formed at the bottom of the outer shell 18; a top end of the combustion chamber 8 is fixedly connected with a bottom end of the outlet 7; part of a left part of the combustion chamber 8 protrudes towards the left to form the right part 2402 of the pipeline; the right part 2402 of the pipeline is communicated with the left part 2401 of the pipeline, the atomizing net 25 is arranged in the right part 2402 of the pipeline and is of a netted structure; a top end of the spray pipe 9 is fixedly connected with a bottom end of the combustion chamber 8; a small opening is formed at a right part of the spray pipe 9, a control box 6 is arranged at the small opening, and an adjusting ingot 12 is arranged in the control box 6; a left part of the control box 6 is communicated with the spray pipe 9, and a micropore 1 is formed at a right part of the control box 6; a turbine wheel 10 and a turbine shaft 11 are arranged in an end of the spray pipe 9; the inner shell is arranged in the outer shell 18; a side surface of the upper pressing plate 15 is bonded with an inner wall of an upper part of the outer shell 18; the cylindrical plate 19, part of the upper pressing plate 15 and part of the bottom of the outer shell 18 are encircled to form a main pressure chamber 14; and the cylindrical plate 19, the rest part of the upper pressing plate 15 except for part of the upper pressing plate 15 which participates in encirclement to form the main pressure chamber 14, and part of the outer shell 18 are encircled to form an auxiliary pressure chamber 20.

The driving device comprises a first motor 1601, a first gear 1602, a first dowel bar 1603 and a first rack 1604 arranged on the first dowel bar 1603; a bottom of the first dowel bar 1603 is fixed above the upper pressing plate 15; the first rack 1604 is engaged with the first gear 1602; and the first motor 1601 can drive the first gear 1602 to rotate.

The first safety device comprises a second motor 2101, a second gear 2102, a bumper 2103 and a second rack 2104 fixed on the bumper 2103; the second motor 2101 can drive the second gear 2102 to rotate; the second rack 2104 is engaged with the second gear 2102; and the action of the bumper 2103 is that a left part of the bumper can be inserted into the middle of the first rack 1604 to prevent the first rack 1604 from moving up.

The second safety device is arranged on a right side of the control box 6 and comprises a third motor 5, a third gear 4, a second dowel bar 2 and a third rack 3; the third motor 5 can drive the third gear 4 to rotate; a left part of the second dowel bar 2 stretches into the control box 6 from the micropore 1; the third rack 3 is fixed on the second dowel bar 2 and engaged with the third gear 4; a right part of the adjusting ingot 12 is fixedly connected with the left part of the second dowel bar 2; and the adjusting ingot 12 and the left part of the second dowel bar 2 can move left and right in the control box 6.

The oil feeder 23 (belonging to the prior art, a specific structure thereof is not shown in the figure) is arranged on a left side of the oil inlet 1702, and the electric ignition device 22 (belonging to the prior art, a specific structure thereof is not shown in the figure) is arranged on a left side of the spray pipe 9.

A specific operation process of the present invention is as follows:

1. After started, the third motor 5 drives the second dowel bar 2 and the adjusting ingot 12 to move to the left, and a channel in the spray pipe 9 is closed.

2. Gasoline is sprayed from the oil feeder 23 and then enters the left part 2401 of the pipeline via the auxiliary pressure chamber 20 and the cylindrical plate slot 13, and outside gas successively enters the auxiliary pressure chamber 20, the cylindrical plate slot 13 and the main pressure chamber 14 from the air inlet 1701.

3. After started, the first motor 1601 drives the first dowel bar 1603 to move down, and the upper pressing plate 15 also moves down with the first dowel bar 1603 and compresses gas and gasoline in the auxiliary pressure chamber 20, the cylindrical plate slot 13 and the main pressure chamber 14; and the compressed gas and gasoline enters the combustion chamber 8.

4. After started, the second motor 2101 drives the bumper 2103 to move to the left, and the left part of the bumper 2103 is inserted into the middle of the first rack 1604 to prevent the first rack (1604) from moving up.

5. After electrified, the electric ignition device 22 ignites fuel in the combustion chamber 8, and after the fuel is combusted, the volume of the fuel is rapidly expanded.

6. After started reversely, the third motor 5 drives the second dowel bar 2 and the adjusting ingot 12 to move to the right, and the channel in the spray pipe 9 is opened.

7. High-pressure gas produced after combustion is sprayed from the combustion chamber 8, enters the spray pipe 9 and acts on the turbine wheel 10 in the spray pipe 9; the turbine wheel 10 rotates, and the turbine shaft 22 rotates with the turbine wheel 10.

8. After started reversely, the second motor 2101 drives the bumper 2103 to move to the right, and a left part of the bumper 2103 is pulled out of the middle of the first rack 1604; and then, after started reversely, the first motor 1601 drives the first dowel bar 1603 and the upper pressing plate 15 to move up, and the upper pressing plate 15 returns to an original position. Then the processes 1-8 above are repeated.

Part of the above description not particularly explained belongs to the prior art or can be realized through the prior art. Any equivalent variation and modification made in accordance with contents of the scope of the application patent of the present invention shall belong to the technical field of the present invention.

What is claimed is:

1. An improved energy-saving one-dimensional internal combustion engine, comprising a compressor, a combustion chamber (8), a pipeline, a spray pipe (9), an oil feeder (23), a driving device, a first safety device, a second safety device, an electric ignition device (22), an atomizing net (25), a rack, a first bracket arranged on a top of the rack, a second bracket arranged on an upper part of the rack, a third bracket arranged on a lower part of the rack and a fourth bracket arranged on a left part of the rack, wherein the driving device is arranged on the first bracket; the first safety device is arranged on the second bracket; the second safety device is arranged on the third bracket; the oil feeder (23) is arranged on the fourth bracket; the pipeline is formed by connecting a left part (2401) of the pipeline and a right part (2402) of the pipeline; the compressor comprises an inner shell and an outer shell (18); the inner shell comprises an upper pressing plate (15) and a cylindrical plate (19); the interior of each of the upper pressing plate (15), the outer shell (18) and the cylindrical plate (19) is hollow; a top of the cylindrical plate (19) is fixed under the upper pressing plate (15); the cylindrical plate (19) is cylindrical, and has a caliber L less than a width M of the upper pressing plate (15); an oil inlet (1702) is formed at an upper end of a left part of the outer shell (18); an air inlet (1702) is formed at an upper end of a right part of the outer shell (18); part of a bottom of the outer shell (18) protrudes downwards to form a cylindrical plate slot (13) corresponding to the cylindrical plate (19); the cylindrical plate (19) can move up and down in the cylindrical plate slot (13); part of a bottom of the cylindrical plate slot (13) protrudes downwards to form the left part (2401) of the pipeline; an outlet (7) is also formed at the bottom of the outer shell (18); a top end of the combustion chamber (8) is fixedly connected with a bottom end of the outlet (7); part of a left part of the combustion chamber (8) protrudes towards the left to form the right part (2402) of the pipeline; the right part (2402) of the pipeline is communicated with the left part (2401) of the pipeline, the atomizing net (25) is arranged in the right part (2402) of the pipeline and is of a netted structure; a top end of the spray pipe (9) is fixedly connected with a bottom end of the combustion chamber (8); a small opening is formed at a right part of the spray pipe (9), a control box (6) is arranged at the small opening, and an adjusting ingot (12) is arranged in the control box (6); a left part of the control box (6) is communicated with the spray pipe (9), and a micropore (1) is formed at a right part of the control box (6); a turbine wheel (10) and a turbine shaft (11) are arranged in an end of the spray pipe (9); the inner shell is arranged in the outer shell (18); a side surface of the upper pressing plate (15) is bonded with an inner wall of an upper part of the outer shell (18); the cylindrical plate (19), part of the upper pressing plate (15) and part of the bottom of the outer shell (18) are encircled to form a main pressure chamber (14); the cylindrical plate (19), the rest part of the upper pressing plate (15) except for part of the upper pressing plate (15) which participates in encirclement to form the main pressure chamber (14), and part of the outer shell (18) are encircled to form an auxiliary pressure chamber (20); the driving device comprises a first motor (1601), a first gear (1602), a first dowel bar (1603) and a first rack (1604) arranged on the first dowel bar (1603); a bottom of the first dowel bar (1603) is fixed above the upper pressing plate (15); the first rack (1604) is engaged with the first gear (1602); and the first motor (1601) can drive the first gear (1602) to rotate.

2. The improved energy-saving one-dimensional internal combustion engine according to claim 1, wherein the first safety device comprises a second motor (2101), a second gear (2102), a bumper (2103) and a second rack (2104) fixed on the bumper (2103); the second motor (2101) can drive the second gear (2102) to rotate; the second rack (2104) is engaged with the second gear (2102); and the action of the bumper (2103) is that a left part of the bumper can be inserted into the middle of the first rack (1604) to prevent the first rack (1604) from moving up.

3. The improved energy-saving one-dimensional internal combustion engine according to claim 1, wherein the second safety device is arranged on a right side of the control box (6) and comprises a third motor (5), a third gear (4), a second dowel bar (2) and a third rack (3); the third motor (5) can drive the third gear (4) to rotate; a left part of the second dowel bar (2) stretches into the control box (6) from the micropore (1); the third rack (3) is fixed on the second dowel bar (2) and engaged with the third gear (4); a right part of the adjusting ingot (12) is fixedly connected with the left part of the second dowel bar (2); and the adjusting ingot (12) and part of the left part of the second dowel bar (2) can move left and right in the control box (6).

4. The improved energy-saving one-dimensional internal combustion engine according to claim 1, wherein the oil feeder (23) is arranged on a left side of the oil inlet (1702), and the electric ignition device (22) is arranged on a left side of the spray pipe (9).

* * * * *